(12) United States Patent
Li

(10) Patent No.: US 12,167,085 B2
(45) Date of Patent: Dec. 10, 2024

(54) VIDEO PROCESSING METHOD AND APPARATUS, STORAGE MEDIUM, AND ELECTRONIC DEVICE

(71) Applicant: BEIJING BYTEDANCE NETWORK TECHNOLOGY CO., LTD., Beijing (CN)

(72) Inventor: Shuangyang Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 102 days.

(21) Appl. No.: 17/770,005

(22) PCT Filed: Aug. 4, 2020

(86) PCT No.: PCT/CN2020/106904
§ 371 (c)(1),
(2) Date: Apr. 18, 2022

(87) PCT Pub. No.: WO2021/073205
PCT Pub. Date: Apr. 22, 2021

(65) Prior Publication Data
US 2022/0394333 A1 Dec. 8, 2022

(30) Foreign Application Priority Data
Oct. 16, 2019 (CN) .......................... 201910983982.3

(51) Int. Cl.
*G06F 3/00* (2006.01)
*G06F 13/00* (2006.01)
(Continued)

(52) U.S. Cl.
CPC ..... *H04N 21/4438* (2013.01); *H04N 21/2187* (2013.01); *H04N 21/4312* (2013.01)

(58) Field of Classification Search
CPC .......... H04N 21/4438; H04N 21/2187; H04N 21/4312; H04N 21/4316; H04N 21/6125; H04N 21/47202; H04N 21/485
See application file for complete search history.

(56) References Cited

U.S. PATENT DOCUMENTS

2011/0273540 A1 11/2011 Lee et al.
2014/0108929 A1 4/2014 Garmark et al.
(Continued)

FOREIGN PATENT DOCUMENTS

CN 101957752 A 1/2011
CN 102915194 A 2/2013
(Continued)

OTHER PUBLICATIONS

International Patent Application No. PCT/CN2020/106904; Int'l Written Opinion and Search Report; dated Sep. 29, 2020; 7 pages.

*Primary Examiner* — Gigi L Dubasky
(74) *Attorney, Agent, or Firm* — BakerHostetler

(57) ABSTRACT

A video processing method, a video processing apparatus, a storage medium and an electronic device are provided. The method includes: detecting whether a first carrying unit preloaded with a first video element meets a predetermined preview condition; playing a video stream corresponding to the first video element through a first player bound to the first carrying unit when the predetermined preview condition is met; stopping playing the video stream in the first player when the predetermined preview condition is not met; detecting whether the first carrying unit meets a predetermined release condition; and releasing the first video element in the first carrying unit and the video stream in the first player when the predetermined release condition is met.

11 Claims, 7 Drawing Sheets

(51) Int. Cl.
      *H04N 5/445*     (2011.01)
      *H04N 21/2187*   (2011.01)
      *H04N 21/431*    (2011.01)
      *H04N 21/443*    (2011.01)

(56) References Cited

U.S. PATENT DOCUMENTS

| | | | |
|---|---|---|---|
| 2016/0343409 A1* | 11/2016 | Wang | H04N 21/47217 |
| 2017/0111681 A1* | 4/2017 | Jiang | H04N 21/4316 |
| 2020/0145726 A1* | 5/2020 | Ciuca | H04N 21/435 |
| 2020/0213642 A1* | 7/2020 | Bartos | H04N 21/6587 |
| 2020/0396498 A1* | 12/2020 | Wang | H04N 21/482 |
| 2022/0078500 A1* | 3/2022 | Lu | H04N 21/2743 |

FOREIGN PATENT DOCUMENTS

| | | | |
|---|---|---|---|
| CN | 105828163 A | 8/2016 | |
| CN | 105872812 A | 8/2016 | |
| CN | 106385590 A | 2/2017 | |
| CN | 106993215 A | 7/2017 | |
| CN | 108984232 A | 12/2018 | |
| CN | 109246461 A | 1/2019 | |
| CN | 109688473 A | 4/2019 | |
| CN | 109819268 A | 5/2019 | |
| CN | 110691282 A | 1/2020 | |

\* cited by examiner

VIDEO PROCESSING METHOD AND APPARATUS, STORAGE MEDIUM, AND ELECTRONIC DEVICE

REFERENCE TO RELATED APPLICATION

This application is the national phase of International Patent Application No. PCT/CN2020/106904, titled "VIDEO PROCESSING METHOD AND APPARATUS, STORAGE MEDIUM, AND ELECTRONIC DEVICE", filed on Aug. 4, 2020, which claims priority to Chinese Patent Application No. 201910983982.3, titled "VIDEO PROCESSING METHOD AND APPARATUS, STORAGE MEDIUM, AND ELECTRONIC DEVICE", filed on Oct. 16, 2019, both of which are incorporated herein by reference in their entireties.

FIELD

The present disclosure relates to the field of data processing, and in particular to a video processing method, a video processing apparatus, a storage medium and an electronic device.

BACKGROUND

Live show applications have become popular in the public. Users can use the live show applications to watch live shows of an anchor, communicate with the anchor, and obtain real-time information. When users use a live show application, there are usually many live rooms in the live show application. With sliding of the user interface, information of different live rooms is presented to the user. According to the presented information, the user may choose to enter one of the live rooms to watch the live video content.

In order to present more information to the user, each live room on the user interface is provided with a preview window so that the user can preview the current video content in the live rooms. However, when the user slides the user interface to select a live room, for previewing the video content in the live room, players in the preview windows are repeatedly released and created, which may result in a large CPU load, and thus a frozen UI interface and a poor fluency.

SUMMARY

In view of above, embodiments of the present disclosure provide a video processing method, a video processing apparatus, a storage medium and an electronic device, to solve the technical problem in the conventional technology that, when the user slides the user interface to select a live room, for previewing the video content in the live room, players in the preview windows are repeatedly released and created, which may result in a large CPU load, and thus a frozen UI interface and a poor fluency.

In an aspect, embodiments of the present disclosure provide a video processing method, including: detecting whether a first carrying unit preloaded with a first video element meets a predetermined preview condition; playing a video stream corresponding to the first video element through a first player bound to the first carrying unit when the predetermined preview condition is met; stopping playing the video stream in the first player when the predetermined preview condition is not met; detecting whether the first carrying unit meets a predetermined release condition; and releasing the first video element in the first carrying unit and the video stream in the first player when the predetermined release condition is met.

In another aspect, embodiments of the present disclosure provide a video processing apparatus, including: a first detection module, configured to detect whether a first carrying unit preloaded with a first video element meets a predetermined preview condition; a first execution module, configured to play a video stream corresponding to the first video element through a first player bound to the first carrying unit when the predetermined preview condition is met; a second execution module, configured to stop playing the video stream in the first player when the predetermined preview condition is not met; a second detection module, configured to detect whether the first carrying unit meets a predetermined release condition; and a release module, configured to release the first video element in the first carrying unit and the video stream in the first player when the predetermined release condition is met.

In another aspect, embodiments of the present disclosure provide a storage medium, storing a computer program, where the computer program, when being executed by a processor, causes the processor to perform the method according to any embodiment in the present disclosure.

In another aspect, embodiments of the present disclosure provide an electronic device, which at least includes a memory, storing a computer program; and a processor, configured to execute the computer program stored in the memory to perform the method according to any embodiment in the present disclosure.

In the embodiments of the present disclosure, each carrying unit is bound with a player, and when the carrying unit is loaded with a video element, the bound player is used to play the video stream of the video element without requiring to recreate a player. When the carrying unit meets the predetermined release condition, only the video element and the video stream in the player are released, instead of the player. Compared with the conventional technology, this embodiment reduces the repeated releasing and creating of the player, thereby greatly reducing the CPU load and making the user interface fluent.

BRIEF DESCRIPTION OF THE DRAWINGS

The above and other features, advantages and aspects of various embodiments of the present disclosure will become more clear when taken in conjunction with the accompanying drawings and with reference to the following detailed description. Throughout the drawings, the same or similar reference numbers refer to the same or similar elements. It should be understood that the drawings are schematic and that the units and elements are not necessarily drawn to scale.

DETAILED DESCRIPTION

Figure 1:
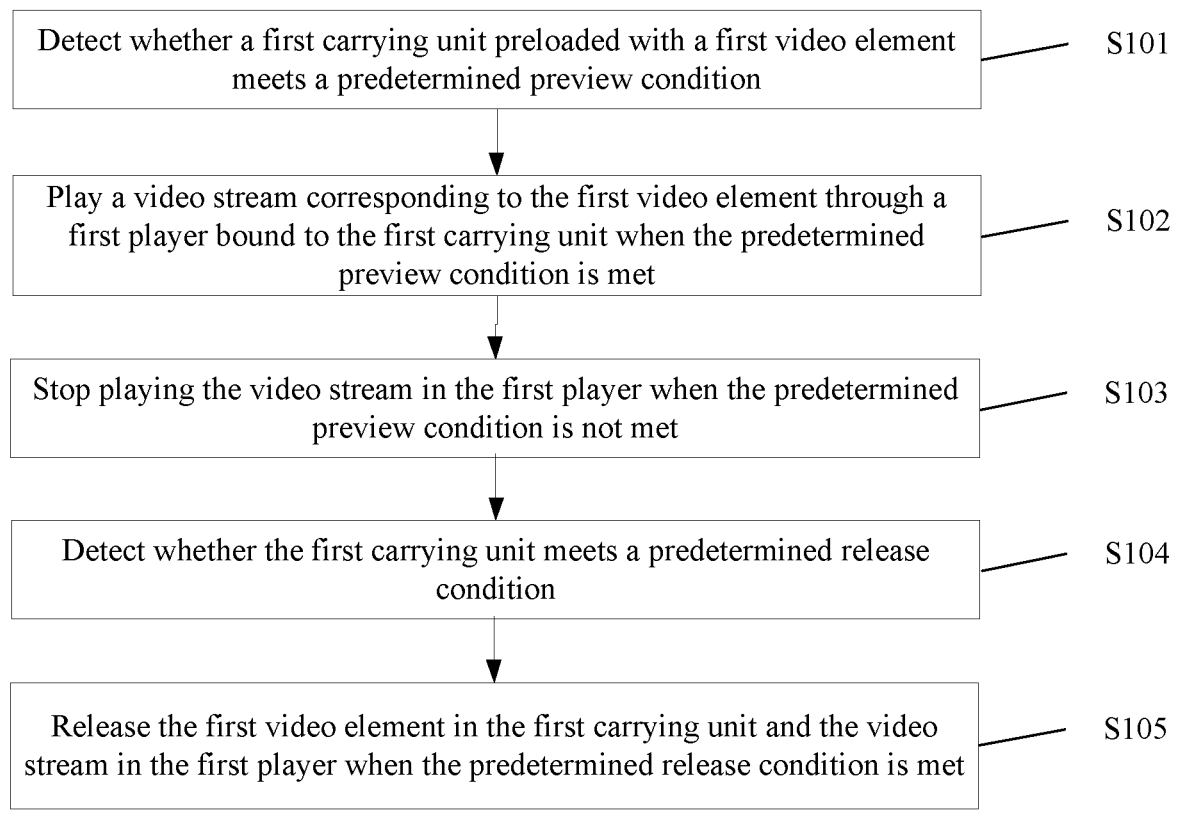
FIG. 1 is a flowchart of a video processing method according to a first embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as being limited to the embodiments set forth herein. The embodiments are provided for a more thorough and complete understanding. It should be understood that the drawings and embodiments of the present disclosure are only provided as examples, and are not intended to limit the protection scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

As used herein, the terms "including" and "comprising" and variations thereof are non-exclusive, i.e., meaning "including but not limited to". The term "based on" means "at least partially based on". The term "an embodiment" means "at least one embodiment", the term "another embodiment" means "at least one another embodiment", and the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless clearly indicated otherwise, they should be understood as "one or more".

The names of messages or information exchanged between multiple devices in the embodiments of the present disclosure are only for illustrative purposes, and are not intended to limit the scope of these messages or information.

A first embodiment of the present disclosure provides a video processing method. As shown in FIG. 1, the video processing method includes steps S101 to S105.

In step S101, it is detected whether a first carrying unit preloaded with a first video element meets a predetermined preview condition.

Figure 2:
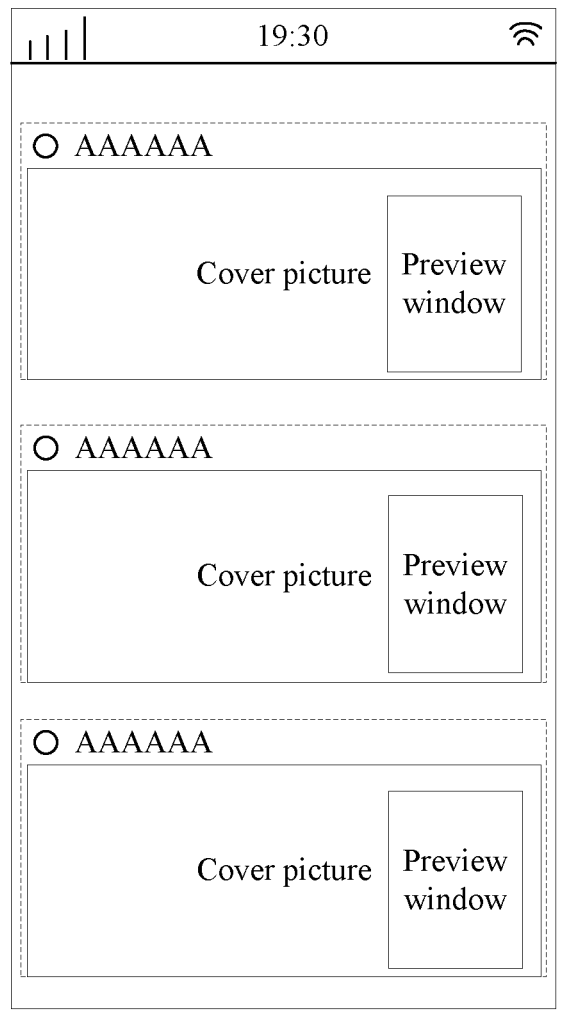
FIG. 2 is a first schematic diagram of a user interface in the first embodiment of the present disclosure.
Figure 3:
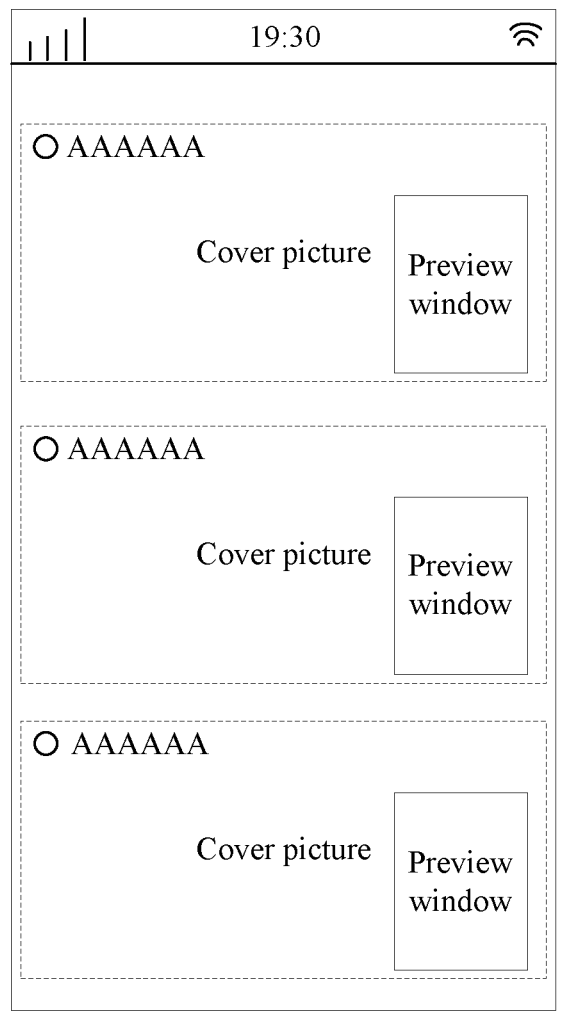
FIG. 3 is a second schematic diagram of a user interface in the first embodiment of the present disclosure.

In order to present more information to the user, each live room on the user interface is provided with a preview window so that the user can preview the current video content in the live rooms. The user interface may be as shown in FIG. 2 or 3. In the figures, each block in dotted line represents a carrying unit. Each carrying unit carries relevant information of a live room, such as the cover picture, the name, the video stream of the live room. The preview window uses a player to play the video stream, so as to realize the preview function.

In the IOS system, a carrying unit can be reused. That is, multiple carrying units may be created according to the number of video elements that can be displayed on a user interface. For example, if a screen of user interface can display at most 3 video elements, the number of the carrying units is at least 3, which is usually set to be 4 or 5.

After the first carrying unit is loaded with the first video element, the video stream of the first video element can be previewed as long as the first carrying unit meets a predetermined preview condition. Those skilled in the art may set the predetermined preview condition in various manners. For example, the predetermined preview condition is that the first carrying unit is the first fully displayed carrying unit on the user interface, or that the first carrying unit is located in a predetermined height range on the user interface. The predetermined preview condition may be set according to the user habits. The predetermined preview condition may be set as that the first carrying unit is a carrying unit that is completely displayed on the user interface. The subsequent process of this embodiment is described by using an example of playing a video stream on the user interface.

In step S102, when the predetermined preview condition is met, a video stream corresponding to the first video element is played through a first player bound to the first carrying unit.

In the conventional technology, in playing a video stream, the carrying unit can be reused, but the player cannot be reused. Therefore, each carrying unit will release the player after the preview ends. When a player is needed for playing another video stream, the player is recreated while loading the video element. This method requires to repeatedly release and create a player, which takes a long time and occupies a large amount of CPU resources, resulting in a frozen user interface.

In this embodiment, each carrying unit is bounded with a player. When the first carrying unit meets the predetermined preview condition, for example, when the user performs a slide-up operation on the interface, the video stream corresponding to the first video element is played through the bound first player, so that the user can view, in the preview window, contents of the live room corresponding to the first video element.

In step S103, when the predetermined preview condition is not met, the playing of the video stream in the first player is stopped.

If the first carrying unit does not meets the predetermined preview condition any longer, for example, if the user continues to perform a slide-up operation, the first player stops playing the video stream. At this time, although the first carrying unit does not meet the predetermined preview condition, it still can be seen on the user interface. In order to ensure the user experience, the first video element in the first carrying unit and the video stream in the first player are not released at this time.

In step S104, it is detected whether the first carrying unit meets a predetermined release condition.

In order to determine when the first video element in the first carrying unit and the video stream in the first player can be released, a predetermined release condition is set in the embodiment of the present disclosure. For example, the predetermined release condition may be that the first carrying unit is out of the user interface. At this time, the user cannot see any information in the first carrying unit, so that the first carrying unit can be released without bringing any bad experience to the user.

In step S105, when the predetermined release condition is met, the first video element in the first carrying unit and the video stream in the first player are released.

In the releasing, as both the first carrying unit and the first player need to be reused, not only the first video element in the first carrying unit is released, but also the video stream in the first player is released. Only in this way can the first carrying unit and the first player be available for reuse.

When the first carrying unit is used again, the video stream to be played in the corresponding first player will be requested again. At this time, the reused first player may bring a frame of image played by the first player in the last time. Although the time of displaying the frame of image played by the first player in the last time is very short, the user may clearly see the frame if the frame of image played by the first player in the last time has quite different color from the first frame of image played by the first player in this time, which will bring a bad experience to the user.

Therefore, in order to ensure that the content in the first player is consistent with the content in the carrying unit, in releasing content in the first carrying unit, not only the content of the first video element in the first carrying unit is released (that is, the address of the video stream is released), but also the current last frame of image of the video stream in the first carrying unit is released, to ensure that the video content played in the last time does not appear in the reused player.

In this embodiment of the present disclosure, each carrying unit is bound with a player, and when the carrying unit is loaded with a video element, the bound player is used to play the video stream of the video element without requiring to recreate a player. When the carrying unit meets the predetermined release condition, only the video element and the video stream in the player are released, instead of the player. Compared with the conventional technology, this embodiment reduces the repeated releasing and creating of the player, thereby greatly reducing the CPU load and making the user interface fluent.

Figure 4:
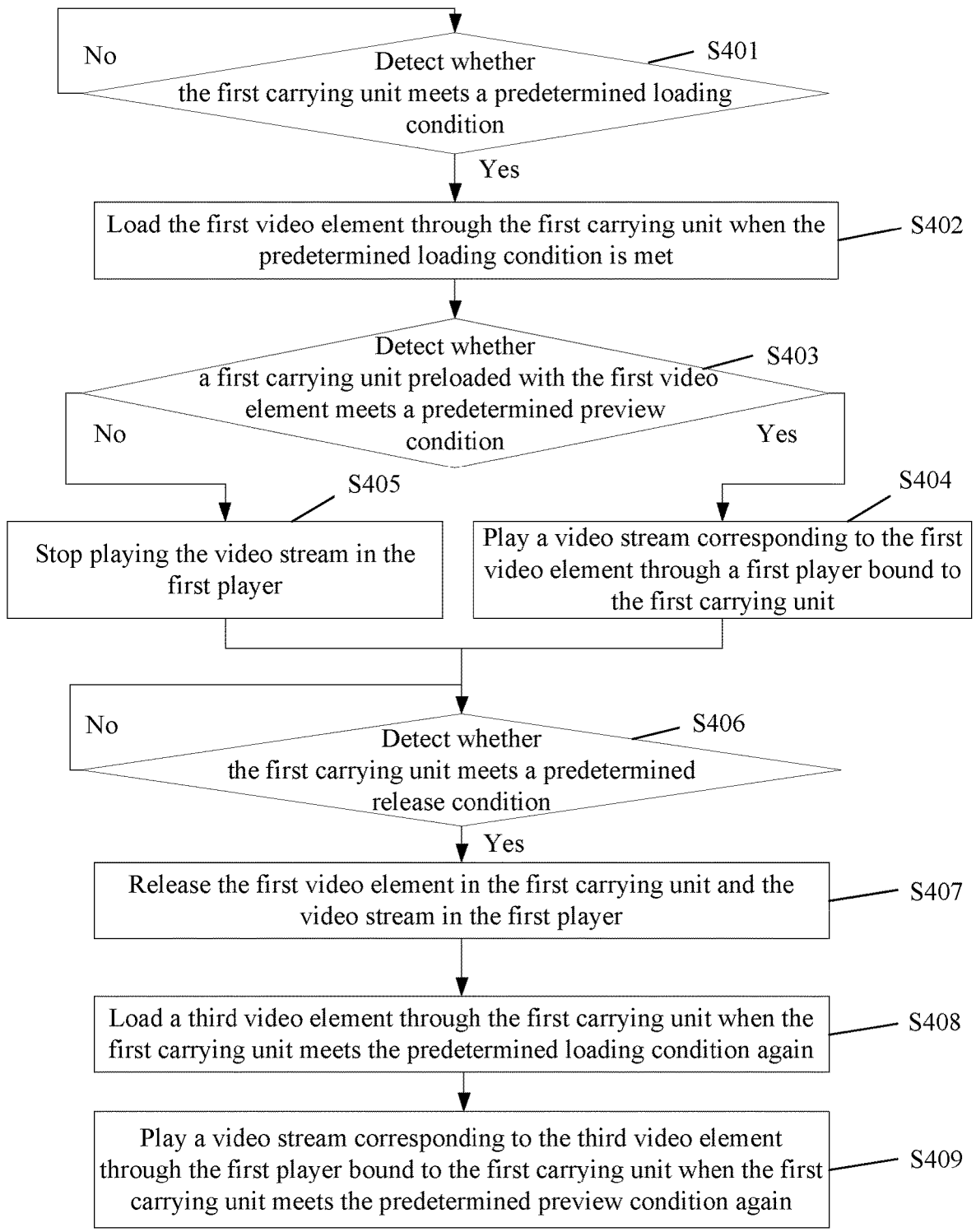
FIG. 4 is a flowchart of a video processing method according to a second embodiment of the present disclosure.

A second embodiment of the present disclosure provides a video processing method. As shown in FIG. 4, the video processing method includes steps S401 to S409.

In step S401, it is detected whether the first carrying unit meets a predetermined loading condition. If the first carrying unit meets the predetermined loading condition, S402 is performed, otherwise S401 is repeated.

Figure 5:
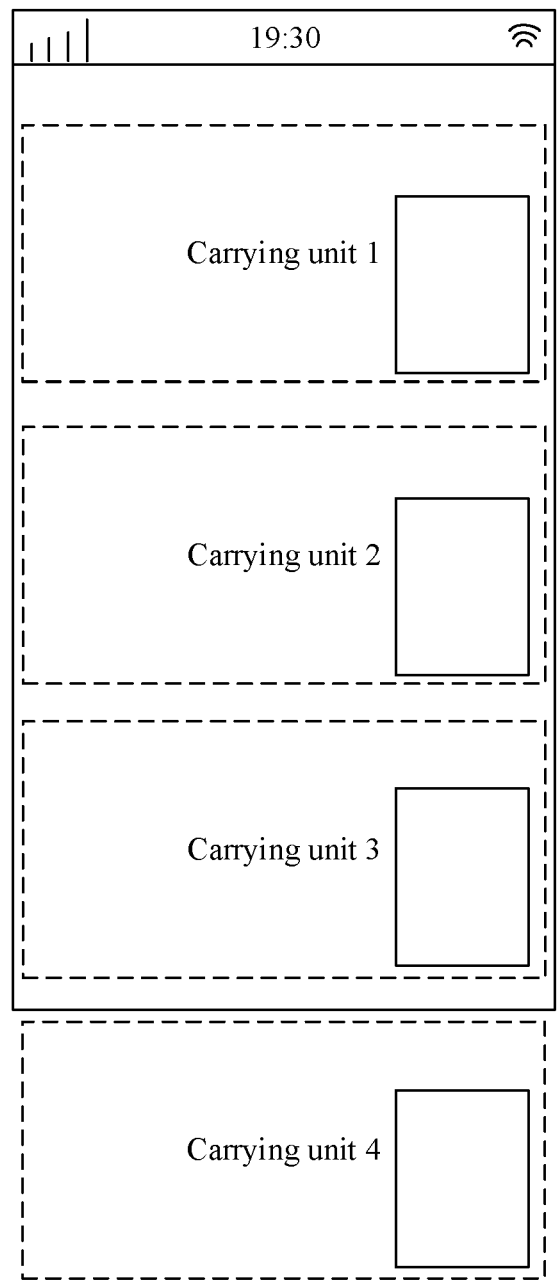
FIG. 5 is a first schematic diagram of meeting a preset loading condition in the second embodiment of the present disclosure.
Figure 6:
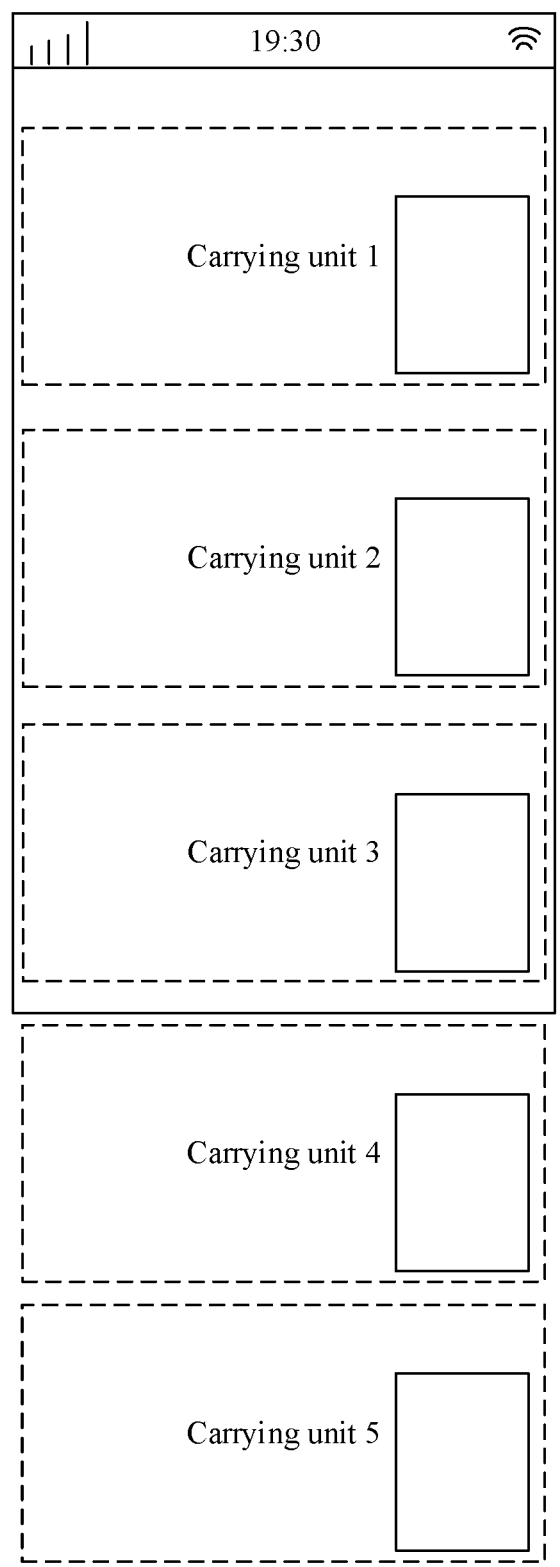
FIG. 6 is a second schematic diagram of meeting a preset loading condition in the second embodiment of the present disclosure.

The predetermined loading condition is usually that the carrying unit is about to be presented on the user interface. For example, although the carrying unit 4 shown in FIG. 5 is not on the user interface, it is the next carrying unit to be presented on the user interface. As shown in FIG. 6, when there are many carrying units, two carrying units to be presented on the user interface may be loaded. That is, carrying unit 4 and carrying unit 5 may both meet the predetermined loading condition, and both can perform the loading.

In step S402, when a predetermined loading condition is met, the first video element is loaded through the first carrying unit.

When the first carrying unit meets the predetermined loading condition, the first video element is loaded. Specifically, the first player may start to load the video stream after the first carrying unit is loaded with more than 50% of the first video element.

In step S403, it is detected whether the first carrying unit preloaded with the first video element meets a predetermined preview condition.

This process is a continuous detection process. During the detection, the first carrying unit may change from a state of meeting the predetermined preview condition to a state of not meeting the predetermined preview condition. If meeting the predetermined preview condition, S404 is performed, otherwise S405 is performed.

In order to present more information to the user, each live room on the user interface is provided with a preview window so that the user can preview the current video content in the live rooms. Each carrying unit carries relevant information of a live room, such as the cover image, the name, the video stream of the live room. The preview window uses the player to play the video stream, so as to realize the preview function.

In the IOS system, a carrying unit can be reused. That is, multiple carrying units may be created according to the number of video elements that can be displayed on a user interface. For example, if a screen of user interface can display at most 3 video elements, the number of the carrying units is at least 3, which is usually set to be 4 or 5.

After the first carrying unit is loaded with the first video element, the video stream of the first video element can be previewed as long as the first carrying unit meets a predetermined preview condition. Those skilled in the art may set the predetermined preview condition in various manners. For example, the predetermined preview condition is that the first carrying unit is the first fully displayed carrying unit on the user interface, or that the first carrying unit is located in a predetermined height range on the user interface. The predetermined preview condition may be set according to the user habits. The predetermined preview condition may be set as that the first carrying unit is a carrying unit that completely displayed on the user interface. The subsequent process of this embodiment is described by using an example of playing a video stream on the user interface.

In step S404, when the predetermined preview condition is met, a video stream corresponding to the first video element is played through a first player bound to the first carrying unit.

In the conventional technology, in playing a video stream, the carrying unit can be reused, but the player cannot be reused. Therefore, each carrying unit will release the player after the preview ends. When a player is needed for playing another video stream, the player is recreated while loading the video element. This method requires to repeatedly release and create a player, which takes a long time and occupies a large amount of CPU resources, resulting in a frozen user interface.

In this embodiment, each carrying unit is bounded with a player. When the first carrying unit meets the predetermined preview conditions, the video stream corresponding to the first video element is played through the bound first player, so that the user can review, in the preview window, contents of the live room corresponding to the first video element.

In step S405, when the predetermined preview condition is not met, the playing of the video stream in the first player is stopped.

If the first carrying unit does not meets the predetermined preview condition any longer, the first player stops playing the video stream. At this time, although the first carrying unit does not meet the predetermined preview condition, it still can be seen on the user interface. In order to ensure the user experience, the first video element in the first carrying unit and the video stream in the first player are not released at this time.

In step S406, it is detected whether the first carrying unit meets a predetermined release condition. If the first carrying unit meets the predetermined release condition, step S407 is performed, otherwise step S406 is repeated.

In order to determine when the first video element in the first carrying unit and the video stream in the first player can be released, a predetermined release condition is set in the embodiment of the present disclosure. For example, the predetermined release condition may be that the first carrying unit is out of the user interface. At this time, the user cannot see any information in the first carrying unit, so that the first carrying unit can be released without bringing any bad experience to the user.

In step S407, when the predetermined release condition is met, the first video element in the first carrying unit and the video stream in the first player are released.

In the releasing, as both the first carrying unit and the first player need to be reused, not only the first video element in the first carrying unit is released, but also the video stream in the first player is released. Only in this way can the first carrying unit and the first player be available for reuse.

When the first carrying unit is used again, the video stream to be played in the corresponding first player will be requested again. At this time, the reused first player may bring a frame of image played by the first player in the last time. Although the time of displaying the frame of image played by the first player in the last time is very short, the user may clearly see the frame if the frame of image played by the first player in the last time has quite different color from the first frame of image played by the first player in this time, which will bring a bad experience to the user.

Therefore, in order to ensure that the content in the first player is consistent with the content in the carrying unit, in releasing content in the first carrying unit, not only the content of the first video element in the first carrying unit is released (that is, the address of the video stream is released), but also the current frame of image of the video stream in the first carrying unit is released, to ensure that the video content played in the last time does not appear in the reused player.

In step S408, when the first carrying unit meets the predetermined loading condition again, a third video element is loaded through the first carrying unit.

This process is a process performed when it is detected, in the detection process of S401 performed again after the first video element in the first carrying unit and the video stream in the first player is released, that the first carrying unit meets the predetermined loading condition again. The process is the same as the process of loading the first video element in S402.

In step S409, when the first carrying unit meets the predetermined preview condition again, a video stream corresponding to the third video element is played through the first player bound to the first carrying unit.

This process is a process performed when the first carrying unit meets the predetermined preview condition again after detecting the first carrying unit preloaded with the first video element meets the predetermined preview condition. This process is the same as the step S404 of playing the video streaming corresponding to the first video element.

The above processes are loading, previewing and releasing processes of the first carrying unit. In practices, the same operations may be performed on other carrying units. For example, it is also detected whether a second carrying unit meets the predetermined loading condition, and when the predetermined loading condition is met, a second video element is loaded through the second carrying unit. This process may be performed at the same time as S401. After the second video element is loaded through the second carrying unit, the same processes as S403 to S409 may also be performed, thereby realizing the same loading, previewing and releasing processes as the first carrying unit.

In practices, it is continuously detected whether there is a carrying unit meeting the predetermined loading condition, and a corresponding video element is loaded to the carrying unit meeting the predetermined loading condition. At the same time, it is detected whether there is a carrying unit meeting the predetermined preview condition, and a video stream is played in the carrying unit meeting the predetermined preview condition.

For example, there are totally 5 carrying units, a user interface can display 3 carrying units together, the predetermined preview condition is that the first carrying unit is the first fully displayed carrying unit on the user interface, and the predetermined release condition is that the first carrying unit is outside the user interface.

When a part of the first carrying unit slides out of the user interface, the first carrying unit does not meet the predetermined preview condition, and then the second carrying unit adjacent to the first carrying unit becomes a carrying unit that meets the predetermined preview condition. At this time, the first player corresponding to the first carrying unit stops playing the video stream, and the second player corresponding to the second carrying unit plays the video stream of the video element corresponding to the second carrying unit.

With the sliding of the user interface by the user, when the first carrying unit is completely outside the user interface, the video element of the first carrying unit is released. At this time, the video stream in the first player corresponding to the first carrying unit is also released.

Since a user interface can only display 3 complete carrying units, when the fifth carrying unit starts to enter the user interface, the fourth carrying unit and the third carrying unit are completely displayed in the user interface, while a part of the second carrying unit is already out of the user interface. With the sliding operation of the user, when the second carrying unit is completely out of the user interface, the video element of the second carrying unit is released, and the video stream in the second player corresponding to the second carrying unit is released. At this time, the third, fourth, and fifth carrying units are completely displayed on the user interface.

Since the reuse mechanism is adopted to both the carrying unit and the player, when the next video element is to be displayed on the user interface, the first carrying unit and its corresponding first player whose content is released are reused. Each carrying unit and corresponding player are reused repeatedly, thereby reducing the CPU occupancy rate.

In this embodiment of the present disclosure, each carrying unit is bound with a player, and when a carrying unit is loaded with a video element, the player bound to the carrying unit is used to play the video stream of the video element without requiring to create a player again. When the carrying unit meets the predetermined release condition, only the video element and the video stream in the player are released, instead of the player. Compared with the conventional technology, this embodiment reduces the repeated releasing and creating of the player, thereby greatly reducing the CPU load and making the user interface fluent.

Figure 7:
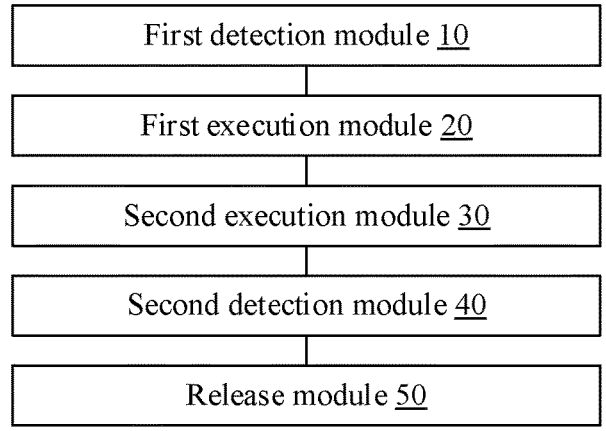
FIG. 7 is a schematic structural diagram of a video processing apparatus according to a third embodiment of the present disclosure.

A third embodiment of the present disclosure provides a video processing apparatus. The schematic structure of the apparatus is shown in FIG. 7.

The video processing apparatus includes: a first detection module 10 configured to detect whether a first carrying unit preloaded with a first video element meets a predetermined preview condition; a first execution module 20, coupled with the first detection module 10 and configured to play a video stream corresponding to the first video element through a first player bound to the first carrying unit when the predetermined preview condition is met; a second execution module 30, coupled with the first execution module 20 and configured to stop playing the video stream in the first player when the predetermined preview condition is not met; a second detection module 40, coupled with the second execution module 30 and configured to detect whether the first carrying unit meets a predetermined release condition; and a release module 50, coupled with the second detection module 40 and configured to release the first video element in the first carrying unit and the video stream in the first player when the predetermined release condition is met.

In order to present more information to the user, each live room on the user interface is provided with a preview window so that the user can preview the current video content in the live rooms. Each carrying unit carries relevant information of a live room, such as the cover picture, the name, the video stream of the live room. The preview window uses a player to play the video stream, so as to realize the preview function.

In the IOS system, a carrying unit can be reused. That is, multiple carrying units may be created according to the number of video elements that can be displayed on a user interface. For example, if a screen of user interface can display at most 3 video elements, the number of the carrying units is at least 3, which is usually set to be 4 or 5.

After the first carrying unit is loaded with the first video element, the video stream of the first video element can be previewed as long as the first carrying unit meets a predetermined preview condition. Those skilled in the art may set the predetermined preview condition in various manners. For example, the predetermined preview condition is that the first carrying unit is the first fully displayed carrying unit on the user interface, or that the first carrying unit is located in a predetermined height range on the user interface. The predetermined preview condition may be set according to the user habits. The predetermined preview condition may be set as that the first carrying unit is a carrying unit that is completely displayed on the user interface. The subsequent process of this embodiment is described by using an example of playing a video stream on the user interface.

In the conventional technology, in playing a video stream, the carrying unit can be reused, but the player cannot be reused. Therefore, each carrying unit will release the player after the preview ends. When a player is needed for playing another video stream, the player is recreated while loading the video element. This method requires to repeatedly release and create a player, which takes a long time and occupies a large amount of CPU resources, resulting in a frozen user interface.

In this embodiment, each carrying unit is bounded with a player. When the first carrying unit meets the predetermined preview condition, the video stream corresponding to the first video element is played through the bound first player, so that the user can view, in the preview window, contents of the live room corresponding to the first video element.

If the first carrying unit does not meets the predetermined preview condition any longer, the first player stops playing the video stream. At this time, although the first carrying unit does not meet the predetermined preview condition, it still can be seen on the user interface. In order to ensure the user experience, the first video element in the first carrying unit and the video stream in the first player are not released at this time.

In order to determine when the first video element in the first carrying unit and the video stream in the first player can be released, a predetermined release condition is set in the embodiment of the present disclosure. For example, the predetermined release condition may be that the first carrying unit is out of the user interface. At this time, the user cannot see any information in the first carrying unit, so that the first carrying unit can be released without bringing any bad experience to the user.

In the releasing, as both the first carrying unit and the first player are to be reused, not only the first video element in the first carrying unit is released, but also the video stream in the first player is released. Only in this way can the first carrying unit and the first player be available for reuse.

When the first carrying unit is used again, the video stream to be played in the corresponding first player will be requested again. At this time, the reused first player may bring a frame of image played by the first player in the last time. Although the time of displaying the frame of image played by the first player in the last time is very short, the user may clearly see the frame if the frame of image played by the first player in the last time has quite different color from the first frame of image played by the first player in this time, which will bring a bad experience to the user.

Therefore, in order to ensure that the content in the first player is consistent with the content in the carrying unit, in releasing content in the first carrying unit, not only the content of the first video element in the first carrying unit is released (that is, the address of the video stream is released), but also the current last frame of image of the video stream in the first carrying unit is released, to ensure that the video content played in the last time does not appear in the reused player. Therefore, The release module is configured to release content of the first video element in the first bearing unit and the current last frame of the video stream in the first player.

The apparatus may further include: a third detection module configured to detected whether the first carrying unit meets a predetermined loading condition; and a first loading module, coupled with the third detection module and the first detection module, and configured to load the first video element through the first bearing unit when the predetermined loading condition is met.

For the reuse of the first carrying unit, the apparatus may further include: a third loading module, configured to load a third video element through the first carrying unit when the first carrying unit meets the predetermined loading condition again. The first execution module is further configured to play a video stream corresponding to the third video element through the first player bound to the first carrying unit when the first carrying unit meets the predetermined preview condition again. In practices, the third loading module may be integrated with the first loading module.

The above processes are loading, previewing and releasing processes of the first carrying unit. In practices, the same operations may be performed for other carrying units. For example, the apparatus may further include a fourth detection module, configured to detect whether a second carrying unit meets the predetermined loading condition; and a second loading module, configured to load a second video element through the second carrying unit when the predetermined loading condition is met.

The fourth detection module may work at the same time as the first detection module, and the second carrying unit can have the same loading, previewing and releasing processes as the first carrying unit.

In this embodiment of the present disclosure, each carrying unit is bound with a player, and when a carrying unit is loaded with a video element, the player bound to the carrying unit is used to play the video stream of the video element without requiring to create a player again. When the carrying unit meets the predetermined release condition, only the video element and the video stream in the player are released, instead of the player. Compared with the conventional technology, this embodiment reduces the repeated releasing and creating of the player, thereby greatly reducing the CPU load and making the user interface fluent.

A fourth embodiment of the present disclosure provides a storage medium, where the storage medium is a computer-readable medium and stores a computer program. When the computer program is executed by a processor, the processor performs the method according to any embodiment of the present disclosure. The method includes the following steps S11 to S15:

S11, detecting whether a first carrying unit preloaded with a first video element meets a predetermined preview condition;

S12, playing a video stream corresponding to the first video element through a first player bound to the first carrying unit when the predetermined preview condition is met;

S13, stopping playing the video stream in the first player when the predetermined preview condition is not met;

S14, detecting whether the first carrying unit meets a predetermined release condition; and S15, releasing the first video element in the first carrying unit and the video stream in the first player when the predetermined release condition is met.

Before the computer program is executed by the processor to detect whether the first bearing unit preloaded with the first video element meets the predetermined preview condition, the computer program is executed by the processor to perform the steps of detecting whether the first carrying unit meets a predetermined loading condition; and loading the first video element through the first carrying unit when the predetermined loading condition is met.

After the computer program is executed by the processor to load the first video element through the first bearing unit, the computer program is also executed by the processor to perform the steps of detecting whether a second carrying unit meets the predetermined loading condition; and loading a second video element through the second carrying unit when the predetermined loading condition is met.

After the computer program is executed by the processor to release the first video element in the first bearing unit and the video stream in the first player, the computer program is also executed by the processor to perform the steps of loading a third video element through the first carrying unit when the first carrying unit meets the predetermined loading condition again; and playing a video stream corresponding to the third video element through the first player bound to the first carrying unit when the first carrying unit meets the predetermined preview condition again.

When the computer program is executed by the processor to release the first video element in the first bearing unit and the video stream in the first player, the computer program is executed by the processor to specifically perform the step of releasing content of the first video element in the first carrying unit and a current last frame of the video stream in the first player.

In this embodiment of the present disclosure, each carrying unit is bound with a player, and when a carrying unit is loaded with a video element, the player bound to the carrying unit is used to play the video stream of the video element without requiring to create a player again. When the carrying unit meets the predetermined release condition, only the video element and the video stream in the player are released, instead of the player. Compared with the conventional technology, this embodiment reduces the repeated releasing and creating of the player, thereby greatly reducing the CPU load and making the user interface fluent.

Figure 8:
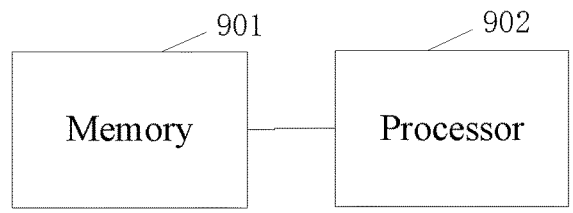
FIG. 8 is a schematic structural diagram of an electronic device according to a fifth embodiment of the present disclosure.

A fifth embodiment of the present disclosure provides an electronic device. The schematic structural diagram of the electronic device may be as shown in FIG. 8, which includes at least a memory 901 and a processor 902. The memory 901 stores a computer program, and the processor 902, when executing the computer program in the memory 901, performs the method according to any embodiment of the present disclosure. Exemplarily, the computer program in the electronic device includes the following steps S21 to S25:

S21, detecting whether a first carrying unit preloaded with a first video element meets a predetermined preview condition;

S22, playing a video stream corresponding to the first video element through a first player bound to the first carrying unit when the predetermined preview condition is met;

S23, stopping playing the video stream in the first player when the predetermined preview condition is not met;

S24, detecting whether the first carrying unit meets a predetermined release condition; and S25, releasing the first video element in the first carrying unit and the video stream in the first player when the predetermined release condition is met.

Before executing the computer program stored in the memory for detecting whether the first bearing unit preloaded with the first video element meets the predetermined preview condition, the processor also executes the following computer program for detecting whether the first carrying unit meets a predetermined loading condition; and loading the first video element through the first carrying unit when the predetermined loading condition is met.

After executing the computer program stored in the memory for loading the first video element through the first bearing unit, the processor also executes the following computer program for detecting whether a second carrying unit meets the predetermined loading condition; and loading a second video element through the second carrying unit when the predetermined loading condition is met.

After executing the computer program stored in the memory for releasing the first video element in the first bearing unit and the video stream in the first player, the processor also executes the following computer program for loading a third video element through the first carrying unit when the first carrying unit meets the predetermined loading condition again; and playing a video stream corresponding to the third video element through the first player bound to the first carrying unit when the first carrying unit meets the predetermined preview condition again.

When executing the computer program stored in the memory for releasing the first video element in the first bearing unit and the video stream in the first player, the processor specifically executes the following computer program for releasing content of the first video element in the first carrying unit and a current last frame of the video stream in the first player.

In this embodiment of the present disclosure, each carrying unit is bound with a player, and when a carrying unit is loaded with a video element, the player bound to the carrying unit is used to play the video stream of the video element without requiring to create a player again. When the carrying unit meets the predetermined release condition, only the video element and the video stream in the player are released, instead of the player. Compared with the conventional technology, this embodiment reduces the repeated releasing and creating of the player, thereby greatly reducing the CPU load and making the user interface fluent.

Figure 9:
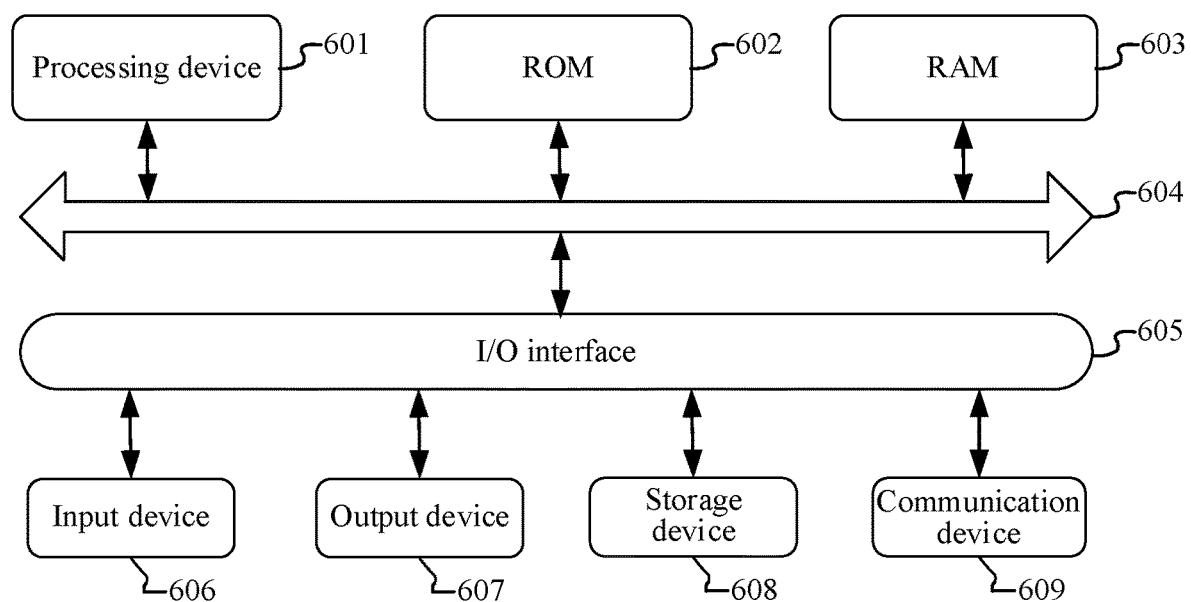
FIG. 9 is another schematic structural diagram of an electronic device according to a fifth embodiment of the present disclosure.

FIG. 9 is another schematic structural diagram of an electronic device for implementing the embodiments of the present disclosure. Terminal devices in the embodiments of the present disclosure may include, but are not limited to, mobile terminals, such as mobile phones, notebook computers, digital broadcast receivers, PDAs (Personal Digital Assistants), PADs (Tablet computers), PMPs (Portable Multimedia Players), vehicle-mounted terminals (such as in-vehicle navigation terminals), and the like, and fixed terminals such as digital TVs, desktop computers, and the like. The electronic device shown in FIG. 9 is only an example, and should not impose any limitation on the functions and applications of the embodiments of the present disclosure.

As shown in FIG. 9, the electronic device 600 may include a processing device 601 (such as a central processing unit, a graphics processor) that may execute various appropriate actions and processes according to a program stored in a read only memory (ROM) 602 or loaded into random access memory (RAM) 603 from a storage device 606. In the RAM 603, various programs and data necessary for the operation of the electronic device 400 are also stored. The processing device 601, the ROM 602, and the RAM 603 are connected to each other through a bus 604. An input/output (I/O) interface 605 is also connected to the bus 604.

Normally, the following devices may be connected to the I/O interface 605: an input device 606 such as a touch screen, a touchpad, a keyboard, a mouse, a camera, a microphone, an accelerometer, a gyroscope and the like; an output device 607, such as a liquid crystal display (LCD), a speaker, a vibrator and the like; a storage device 606, such as a magnetic tape, a hard disk and the like; and a communication device 609. The communication device 609 may enable the electronic device 600 to communicate in a wireless or wired manner with other devices to exchange data. Although FIG. 9 shows the electronic device 600 having various means, it should be understood that not all of the illustrated means are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium. The computer program includes program code for performing the method illustrated in the flowchart. In such an embodiment, the computer program may be downloaded and installed from the network via the communication device 609, or from the storage device 606, or from the ROM 602. When the computer program is executed by the processing device 601, the above-mentioned functions in the methods of the embodiments of the present disclosure are executed.

In some embodiments, the client and server may use any currently known or future network protocol such as HTTP (HyperText Transfer Protocol) to communicate, and may be connected with digital data network in any form or medium (such as a communication network). Examples of communication networks include local area networks (LAN), wide area networks (WAN), the Internet (eg, the Internet), and peer-to-peer networks (such as ad hoc peer-to-peer networks), as well as any current or future network.

The above-mentioned computer-readable medium may be included in the above-mentioned electronic device, or may exist alone without being assembled into the electronic device.

The above-mentioned computer-readable medium carries one or more programs. The above-mentioned one or more programs, when being executed by the electronic device, cause the electronic device to: detecting whether a first carrying unit preloaded with a first video element meets a predetermined preview condition; playing a video stream corresponding to the first video element through a first player bound to the first carrying unit when the predetermined preview condition is met; stopping playing the video stream in the first player when the predetermined preview condition is not met; detecting whether the first carrying unit meets a predetermined release condition; and releasing the first video element in the first carrying unit and the video stream in the first player when the predetermined release condition is met.

Computer program code for performing operations of the present disclosure may be written in one or more programming languages, including but not limited to object-oriented programming languages, such as Java, Smalltalk, C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to the user's computer through any kind of network, including a local area network (LAN) or a wide area network (WAN), or may be connected to an external computer (eg, using Internet connection provided by an Internet service provider).

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage media may include, but are not limited to, electrical connections with one or more wires, portable computer disks, hard disks, a random access memory (RAM), a read only memory (ROM), an erasable Programmable read only memory (EPROM or flash memory), a optical fiber, a portable compact disk read only memory (CD-ROM), optical storage devices, magnetic storage devices, or any suitable combination thereof. In this disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium can also be any computer-readable medium other than a computer-readable storage medium that can transmit, propagate, or transport the program for use by or in connection with the instruction execution system, apparatus or device. Program code stored on a computer readable medium may be transmitted using any suitable medium including, but not limited to, an electrical wire, an optical fiber cable, RF (radio frequency), or any suitable combination thereof.

The flowchart and block diagrams in the Figures illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform the specified functions or operations, or may be implemented by a combination of dedicated hardware and computer instructions.

The units involved in the embodiments of the present disclosure may be implemented in a software manner, or in a hardware manner. The name of the unit does not constitute a limitation of the unit under any circumstances.

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with the instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, devices, or devices, or any suitable combination thereof. More specific examples of machine-readable storage media include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

The above merely describes preferred embodiments of the present disclosure and illustrates the technical principles. Those skilled in the art should understand that the scope of the disclosure is not limited to the technical solutions formed by the specific combination of the above-mentioned technical features, and should also cover, without departing from the above disclosed concept, the technical solutions formed by any combination of the above-mentioned technical features or other equivalent features. For example, a technical solution may be formed by replacing a feature with another feature having similar function disclosed in the present disclosure (but not limited to).

Additionally, although operations are depicted in a particular order, this should not be construed as requiring the operations to be performed in the particular order shown or in a sequential order. Under certain circumstances, multitasking and parallel processing may be advantageous. Although the above discussion contains several implementation details, these should not be construed as limitations on the scope of the present disclosure. Certain features that are described in the context of separate embodiments can also be combined into a same embodiment. Various features that are described in a same embodiment can also be implemented separately in multiple embodiments or in any suitable subcombination.

Although the subject matter has been described in terms of structural features and/or logical acts of method, it is to be understood that the subject matter defined in the appended claims is not necessarily limited to the specific features or acts described above. Rather, the specific features and acts described above are merely examples of implementing the claims.

The various embodiments of the present disclosure have been described in detail above, but the present disclosure is not limited to these specific embodiments. Those skilled in the art can make various variations and modifications on the basis of the concept of the present disclosure. These variations and modifications all should fall within the scope of the claimed protection of the present disclosure.

The invention claimed is:

1. A video processing method, comprising:
creating a plurality of carrying units each of which is bound with a player;
detecting whether a first carrying unit preloaded with a first video element meets a predetermined preview condition;
playing a video stream corresponding to the first video element through a first player bound with the first carrying unit in response to detecting that the predetermined preview condition is met;
stopping playing the video stream in the first player in response to determining that the predetermined preview condition is no longer met;
detecting whether the first carrying unit meets a predetermined release condition; and
in response to detecting that the predetermined release condition is met, releasing the first video element in the first carrying unit and the video stream in the first player instead of releasing the first player.

2. The method according to claim 1, wherein before the detecting whether a first carrying unit preloaded with a first video element meets a predetermined preview condition, the method further comprises:
detecting whether the first carrying unit meets a predetermined loading condition; and
loading the first video element through the first carrying unit when the predetermined loading condition is met.

3. The method according to claim 2, wherein after the loading the first video element through the first carrying unit, the method further comprises:
- detecting whether a second carrying unit meets the predetermined loading condition; and
- loading a second video element through the second carrying unit when the predetermined loading condition is met.

4. The method according to claim 1, wherein after the releasing the first video element in the first carrying unit and the video stream in the first player, the method further comprises:
- loading a third video element through the first carrying unit when the first carrying unit meets the predetermined loading condition again; and
- playing a video stream corresponding to the third video element through the first player bound to the first carrying unit when the first carrying unit meets the predetermined preview condition again.

5. The method according to claim 1, wherein the releasing the first video element in the first carrying unit and the video stream in the first player comprises:
- releasing a content of the first video element in the first carrying unit and a current last frame of the video stream in the first player.

6. A video processing device, comprising:
- at least one processor; and
- at least one memory communicatively coupled to the at least one processor and storing instructions that upon execution by the at least one processor cause the device to perform operations comprising:
- creating a plurality of carrying units each of which is bound with a player;
- detecting whether a first carrying unit preloaded with a first video element meets a predetermined preview condition;
- playing a video stream corresponding to the first video element through a first player bound with the first carrying unit in response to detecting that the predetermined preview condition is met;
- stopping playing the video stream in the first player in response to determining that the predetermined preview condition is no longer met;
- detecting whether the first carrying unit meets a predetermined release condition; and
- in response to detecting that the predetermined release condition is met, releasing the first video element in the first carrying unit and the video stream in the first player instead of releasing the first player.

7. The device according to claim 6,
wherein before the detecting whether a first carrying unit preloaded with a first video element meets a predetermined preview condition, the at least one memory communicatively coupled to the at least one processor and storing instructions that upon execution by the at least one processor also cause the device to perform operations comprising:
- detecting whether the first carrying unit meets a predetermined loading condition; and
- loading the first video element through the first carrying unit when the predetermined loading condition is met.

8. The device according to claim 7,
wherein after the loading the first video element through the first carrying unit, at least one memory communicatively coupled to the at least one processor and storing instructions that upon execution by the at least one processor also cause the device to perform operations comprising:
- detecting whether a second carrying unit meets the predetermined loading condition; and
- loading a second video element through the second carrying unit when the predetermined loading condition is met.

9. The device according to claim 6,
wherein after the releasing the first video element in the first carrying unit and the video stream in the first player, the at least one memory communicatively coupled to the at least one processor and storing instructions that upon execution by the at least one processor also cause the device to perform operations comprising:
- loading a third video element through the first carrying unit when the first carrying unit meets the predetermined loading condition again; and
- playing a video stream corresponding to the third video element through the first player bound to the first carrying unit when the first carrying unit meets the predetermined preview condition again.

10. The apparatus according to claim 6,
wherein the releasing the first video element in the first carrying unit and the video stream in the first player comprises:
- releasing a content of the first video element in the first carrying unit and a current last frame of the video stream in the first player.

11. A non-transitory storage medium, storing a computer program, wherein the computer program, when being executed by a processor, causes the processor to perform operations comprising:
- creating a plurality of carrying units each of which is bound with a player;
- detecting whether a first carrying unit preloaded with a first video element meets a redetermined preview condition;
- playing a video stream corresponding to the first video element through a first player bound with the first carrying unit in response to detecting that the predetermined preview condition is met;
- stopping playing the video stream in the first player in response to determining that the predetermined preview condition is no longer met;
- detecting whether the first carrying unit meets a predetermined release condition; and
- in response to detecting that the predetermined release condition is met, releasing the first video element in the first carrying unit and the video stream in the first player instead of releasing the first player.

* * * * *